(12) United States Patent
Evans et al.

(10) Patent No.: US 11,970,044 B2
(45) Date of Patent: Apr. 30, 2024

(54) HEATING AND COOLING SYSTEM FOR A VEHICLE

(71) Applicant: Ford Global Technologies, LLC, Dearborn, MI (US)

(72) Inventors: Tim Van Evans, Ypsilanti, MI (US); Manfred Koberstein, Troy, MI (US); Angelo Patti, Pleasant Ridge, MI (US); Saad Afzal Bhatti, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 17/085,602

(22) Filed: Oct. 30, 2020

(65) Prior Publication Data

US 2022/0134840 A1   May 5, 2022

(51) Int. Cl.
| | | |
|---|---|---|
| *B60H 1/00* | (2006.01) | |
| *B60H 1/32* | (2006.01) | |
| *F28D 9/00* | (2006.01) | |
| *F28D 20/00* | (2006.01) | |
| *F28D 20/02* | (2006.01) | |
| *F28D 21/00* | (2006.01) | |

(52) U.S. Cl.
CPC ..... *B60H 1/00764* (2013.01); *B60H 1/00007* (2013.01); *B60H 1/00278* (2013.01); *B60H 1/00342* (2013.01); *B60H 1/32281* (2019.05); *B60H 1/323* (2013.01); *F28D 9/005* (2013.01); *F28D 20/02* (2013.01); *B60H 2001/00307* (2013.01); *F28D 2020/0013* (2013.01); *F28D 2021/0084* (2013.01); *F28D 2021/0085* (2013.01)

(58) Field of Classification Search
CPC ........... B60H 1/00764; B60H 1/00007; B60H 1/00278; B60H 1/00342; B60H 1/32281; B60H 1/323; B60H 2001/00307; F28D 9/005; F28D 20/02; F28D 2020/0013; F28D 2021/0084; F28D 2021/0085
See application file for complete search history.

(56) References Cited

U.S. PATENT DOCUMENTS

| | | | | |
|---|---|---|---|---|
| 4,402,188 A | * | 9/1983 | Skala | ...................... F24D 11/02 |
| | | | | 62/238.7 |
| 5,390,505 A | * | 2/1995 | Smith | ................... F28D 7/0066 |
| | | | | 62/90 |
| 5,871,041 A | * | 2/1999 | Rafalovich | ........ B60H 1/00492 |
| | | | | 165/41 |

(Continued)

FOREIGN PATENT DOCUMENTS

| | | | | | |
|---|---|---|---|---|---|
| EP | | 3040644 A1 | * | 7/2016 | ............ F24F 5/0017 |
| EP | | 2766668 B1 | * | 11/2017 | ............ F24F 5/0021 |

(Continued)

*Primary Examiner* — Ljiljana V. Ciric
(74) *Attorney, Agent, or Firm* — Vichit Chea; Price Heneveld LLP (57) ABSTRACT

A vehicle having a heating and cooling system includes a refrigerant loop for conveying refrigerant, a coolant loop for conveying coolant, a chiller configured to convey the refrigerant and the coolant, and a vessel coupled to the chiller and having a phase change material disposed in the vessel. The phase change material is configured to freeze via heat transfer from the phase change material to the refrigerant and melt via heat transfer from the coolant to the phase change material.

10 Claims, 4 Drawing Sheets

(56) References Cited

U.S. PATENT DOCUMENTS

| | | | | |
|---|---|---|---|---|
| 6,230,496 B1* | 5/2001 | Hofmann | ............... | B60L 50/30 60/706 |
| 6,324,860 B1* | 12/2001 | Maeda | ............... | F24F 5/001 62/96 |
| 6,464,027 B1* | 10/2002 | Dage | ............... | F01P 3/20 123/41.14 |
| 6,606,877 B2* | 8/2003 | Tomita | ............... | B60H 1/005 165/10 |
| 6,682,844 B2* | 1/2004 | Genc | ............... | H01M 8/04007 429/437 |
| 7,089,756 B2 | 8/2006 | Hu | | |
| 7,134,483 B2* | 11/2006 | Barnwell | ............... | B01D 53/265 62/93 |
| 7,721,787 B2* | 5/2010 | Barnwell | ............... | F25B 39/022 62/93 |
| 8,261,868 B2* | 9/2012 | Goenka | ............... | B60H 1/00478 180/68.2 |
| 8,443,868 B2* | 5/2013 | Barnwell | ............... | F25B 39/022 62/434 |
| 8,899,062 B2 | 12/2014 | Kadle | | |
| 9,103,573 B2* | 8/2015 | Goenka | ............... | B60H 1/00478 |
| 9,105,951 B2* | 8/2015 | Anderson-Straley | ............... | H01M 10/613 |
| 9,365,090 B2* | 6/2016 | Gawthrop | ............... | B60H 1/00007 |
| 9,789,746 B2 | 10/2017 | Levin | | |
| 9,821,630 B2* | 11/2017 | Goenka | ............... | B60H 1/005 |
| 9,855,815 B2* | 1/2018 | Saab | ............... | B60H 1/00385 |
| 9,989,271 B1* | 6/2018 | Becker | ............... | F24F 5/0021 |
| 10,351,042 B2* | 7/2019 | Viegas | ............... | F25B 1/00 |
| 10,403,946 B2 | 9/2019 | Jalilevand | | |
| 10,603,976 B2* | 3/2020 | Androulakis | ............... | B60N 2/56 |
| 10,625,566 B2* | 4/2020 | Androulakis | ............... | B60N 2/5678 |
| 11,091,007 B2* | 8/2021 | Ferraris | ............... | B60L 58/27 |
| 11,325,443 B2* | 5/2022 | Kim | ............... | B60H 1/00921 |
| 11,358,433 B2* | 6/2022 | Androulakis | ............... | B60N 2/5621 |
| 11,448,427 B2* | 9/2022 | Liu | ............... | B60H 1/3227 |
| 11,472,255 B2* | 10/2022 | Tisdale | ............... | B60H 1/00921 |
| 2016/0187013 A1* | 6/2016 | Becker | ............... | F24F 5/0017 62/99 |
| 2020/0189357 A1* | 6/2020 | Chopard | ............... | B60H 1/00499 |
| 2022/0134840 A1* | 5/2022 | Evans | ............... | B60H 1/00007 62/117 |

FOREIGN PATENT DOCUMENTS

| | | | | |
|---|---|---|---|---|
| EP | 2906894 B1 | 6/2019 | | |
| EP | 3623183 A1 * | 3/2020 | ......... | B60H 1/00007 |
| EP | 3623183 B1 * | 12/2020 | ......... | B60H 1/00007 |
| WO | WO-2019186077 A1 * | 10/2019 | ......... | B60H 1/00278 |

* cited by examiner

HEATING AND COOLING SYSTEM FOR A VEHICLE

FIELD OF THE DISCLOSURE

The present disclosure is generally directed to a heating and cooling system for a vehicle. More particularly, the present disclosure is generally directed to a heating and cooling system for a vehicle that includes a chiller and a vessel coupled to the chiller with a phase change material disposed therein.

BACKGROUND OF THE DISCLOSURE

Vehicle HVAC systems typically include a compressor that, while in the on condition, is configured to propel refrigerant through refrigerant loops to condition air and cool vehicle batteries. A vehicle HVAC system that is able to condition air and cool vehicle batteries when the compressor is not propelling refrigerant may be desired.

SUMMARY OF THE DISCLOSURE

According to a first aspect of the present disclosure, a vehicle includes an engine operable between on and off conditions and a heating and cooling system. The heating and cooling system includes a compressor operable to propel refrigerant within a refrigerant loop in the on condition of the engine, a pump operable to propel coolant within a coolant loop in the on and off conditions of the engine, a chiller configured to convey the refrigerant and the coolant, and a vessel coupled to the chiller and having a phase change material disposed therein. The phase change material is configured to freeze via heat transfer from the phase change material to the refrigerant in the on condition of the engine and melt via heat transfer from the coolant to the phase change material in the off condition of the engine.

Embodiments of the first aspect of the present disclosure may include any one or a combination of the following features:
  the chiller is a plate chiller including a first plate and a second plate, wherein the vessel is positioned between the first plate and the second plate;
  the coolant loop includes a cabin loop having a heater core, a battery loop for conveying the coolant to a battery of the vehicle, and a valve system coupled to the cabin and battery loops and configured to regulate the flow of the coolant within the cabin and battery loops;
  a blower operable to pass air over the heater core in the on and off conditions of the engine, wherein in the on condition of the engine, heat is transferred from the engine to the coolant, such that the coolant is warmer than the air passed over the heater core and the air is heated via heat transfer from the coolant to the air, and wherein in the off condition of the engine, heat is transferred from the coolant to the phase change material, such that the coolant is cooler than the air passed over the heater core and the air is cooled via heat transfer from the air to the coolant;
  in the off condition of the engine, the pump is operable to propel coolant through the battery loop, such that heat is transferred from the battery to the coolant, and through the chiller, such that heat is transferred from the coolant to the phase change material;
  the battery is a traction battery; and
  the phase change material is configured to freeze at a temperature in a range of about 15 degrees Celsius to about 25 degrees Celsius.

According to a second aspect of the present disclosure, a vehicle includes a heating and cooling system. The heating and cooling system includes a refrigerant loop for conveying refrigerant, a coolant loop for conveying coolant, a chiller configured to convey the refrigerant and the coolant, and a vessel coupled to the chiller and having a phase change material disposed therein. The phase change material is configured to freeze via heat transfer from the phase change material to the refrigerant and melt via heat transfer from the coolant to the phase change material.

Embodiments of the second aspect of the present disclosure may include any one or a combination of the following features:
  the chiller is a plate chiller including a first plate and a second plate, wherein the vessel is positioned between the first plate and the second plate;
  an engine operable between on and off conditions, wherein the phase change material is configured to freeze via heat transfer from the phase change material to the refrigerant in the on condition of the engine and melt via heat transfer from the coolant to the phase change material in the off condition of the engine;
  a blower operable to pass air over a heater core of the coolant loop in the on and off conditions of the engine, wherein in the on condition of the engine, heat is transferred from the engine to the coolant, such that the coolant is warmer than the air passed over the heater core and the air is heated via heat transfer from the coolant to the air, and wherein in the off condition of the engine, heat is transferred from the coolant to the phase change material, such that the coolant is cooler than the air passed over the heater core and the air is cooled via heat transfer from the air to the coolant;
  the coolant loop includes a battery loop proximate to a battery of the vehicle and configured to convey coolant to cool the battery via heat transfer from the battery to the coolant; and
  in the off condition of the engine, a pump is operable to propel coolant through the battery loop, such that heat is transferred from the battery to the coolant, and through the chiller, such that heat is transferred from the coolant to the phase change material.

According to a third aspect of the present disclosure, a method of operating a heating and cooling system of a vehicle includes the steps of freezing a phase change material disposed within a vessel coupled to a chiller via heat transfer from the phase change material to a refrigerant conveyed through the chiller, and melting the phase change material via heat transfer from a coolant conveyed through the chiller to the phase change material.

Embodiments of the third aspect of the present disclosure may include any one or a combination of the following steps and features:
  starting an engine of the vehicle, such that the engine is in an on condition, and stopping the engine, such that the engine is in an off condition, wherein the phase change material freezes in the on condition of the engine and melts in the off condition of the engine;
  the refrigerant is propelled through the chiller by a compressor configured to operate in the on condition of the engine, and the coolant is propelled through the chiller by a pump configured to operate in the on condition of the engine and the off condition of the engine;

propelling the coolant through a heater core, passing air over the heater core and into a cabin of the vehicle, heating the air passing over the heater core via heat transfer from the coolant to the air, and cooling the air passing over the heater core via heat transfer from the air to the coolant;

the chiller is a plate chiller including a first plate and a second plate, wherein the vessel is positioned between the first plate and the second plate;

the phase change material is configured to freeze at a temperature in a range of about 15 degrees Celsius to about 25 degrees Celsius; and cooling a battery of the vehicle via heat transfer from the battery to the coolant in the off condition of the engine.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, according to a first aspect of the present disclosure, a vehicle 10 includes an engine 12 operable between on and off conditions and a heating and cooling system 22. The heating and cooling system 22 includes a compressor 32 operable to propel refrigerant 26 within a refrigerant loop 24 in the on condition of the engine 12, a pump 58 operable to propel coolant 30 within a coolant loop 28 in the on and off conditions of the engine 12, a chiller 48 configured to convey the refrigerant 26 and the coolant 30, and a vessel 50 coupled to the chiller 48 and having a phase change material 52 disposed therein. The phase change material 52 is configured to freeze via heat transfer from the phase change material 52 to the refrigerant 26 in the on condition of the engine 12 and melt via heat transfer from the coolant 30 to the phase change material 52 in the off condition of the engine 12.

Figure 1:
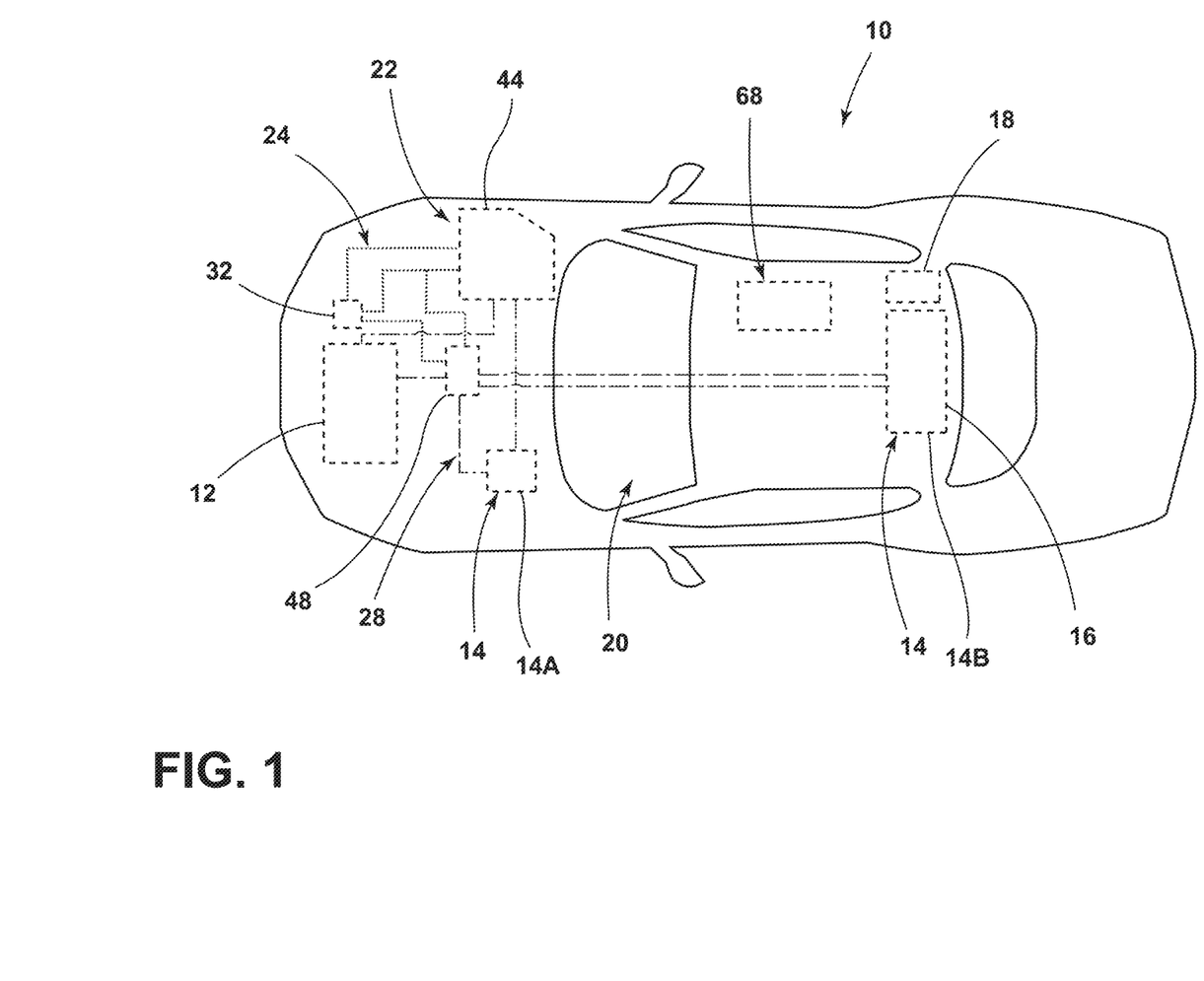
FIG. 1 is a schematic plan view of a vehicle, illustrating a heating and cooling system, an engine, and a battery of the vehicle, according to one embodiment.

Referring now to FIG. 1, the vehicle 10 includes the engine 12. The engine 12 may be at least one of a variety of types of internal combustion engines (e.g., gas engine, diesel engine, etc.). The engine 12 may be configured to drive motion of the vehicle 10. The vehicle 10 may include a battery 14. The battery 14 may be configured to power a variety of electric components of the vehicle 10, such as a starter motor, lights, and an ignition. In some embodiments, wherein the vehicle 10 is a hybrid electric vehicle, the battery 14 may be a traction battery 16 configured to power an electric motor 18 that drives motion of the vehicle 10. In some embodiments, the vehicle 10 may include a plurality of batteries 14. For example, the vehicle 10 may include a first battery 14A configured to power the starter motor, lights, and the ignition, and a second battery 14B configured to power the electric motor 18 that drives motion of the vehicle 10, as illustrated in FIG. 1. The vehicle 10 may include a cabin 20 for passengers of the vehicle 10, as further illustrated in FIG. 1.

Figure 2:
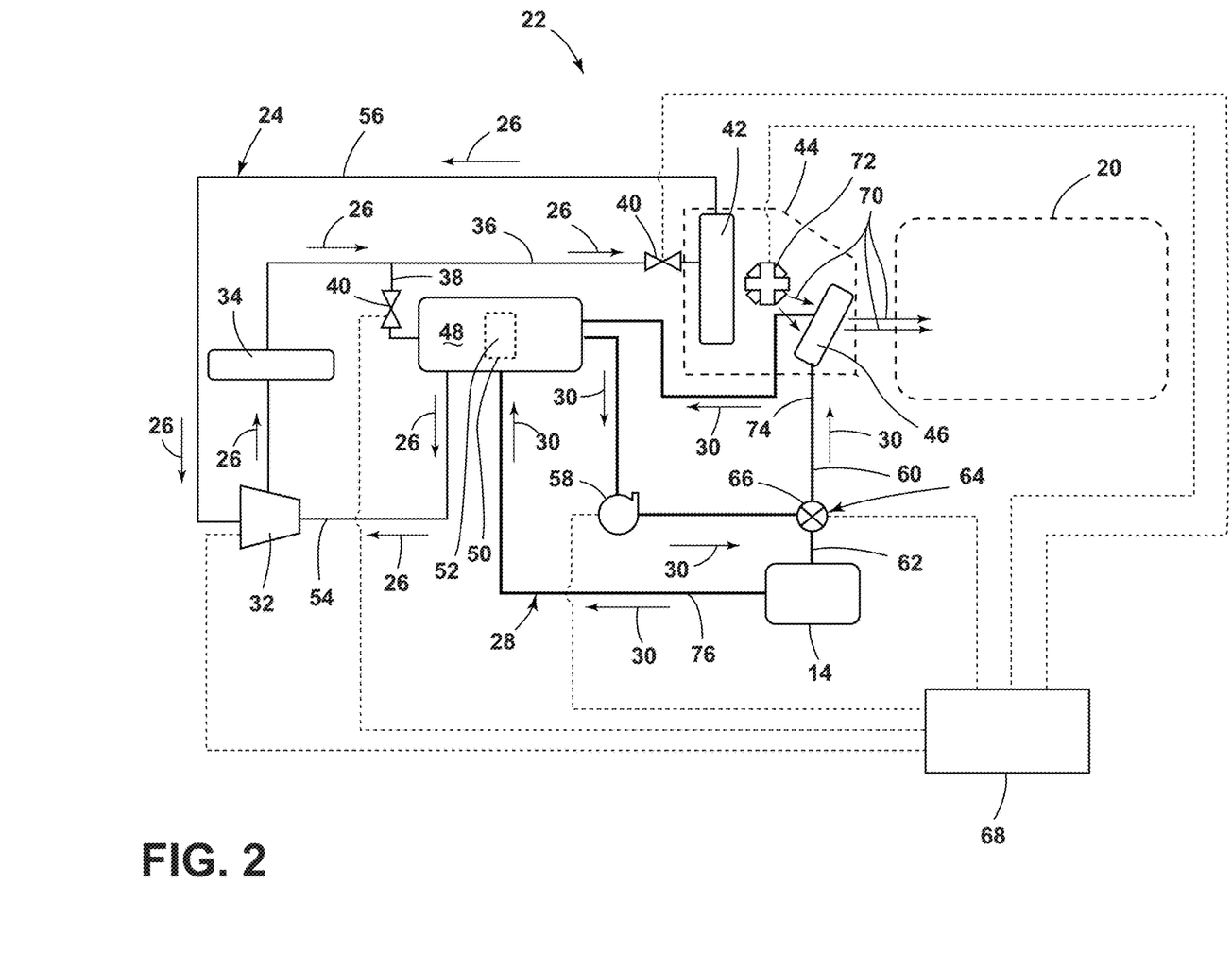
FIG. 2 is a schematic diagram of the heating and cooling system of the vehicle, according to one embodiment.
Figure 3:
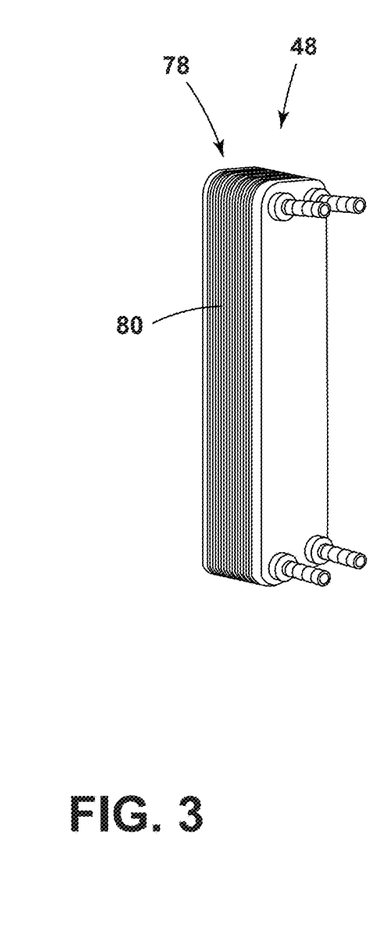
FIG. 3 is a perspective view of a chiller of the heating and cooling system of the vehicle, according to one embodiment.

Referring now to FIGS. 1-3, the vehicle 10 includes the heating and cooling system 22. The heating and cooling system 22 includes the refrigerant loop 24 configured to convey refrigerant 26 and the coolant loop 28 configured to convey coolant 30. As illustrated in FIG. 2, the refrigerant loop 24 includes a compressor 32. The compressor 32 is configured to propel refrigerant 26 within the refrigerant loop 24. In various implementations, the compressor 32 is configured to take in, compress, and propel refrigerant 26 into a conduit coupled to a condenser 34. The refrigerant 26 condenses within the condenser 34 as heat is transferred out of the refrigerant 26, and the refrigerant 26 flows out of condenser 34 through conduit that splits into an evaporator inlet line 36 and a chiller inlet line 38. In the embodiment illustrated in FIG. 2, expansion valves 40 are disposed on both the evaporator inlet line 36 and the chiller inlet line 38. As the refrigerant 26 flows through the expansion valves 40 the pressure of the refrigerant 26 is reduced.

The refrigerant 26 that flows through expansion valve 40 coupled to the evaporator inlet line 36 flows onward to an evaporator 42. As illustrated in FIGS. 1 and 2, the evaporator 42 is positioned within an HVAC case 44 positioned vehicle-forward of the cabin 20 of the vehicle 10. As the pressure-reduced refrigerant 26 reaches the evaporator 42, the refrigerant 26 evaporates and absorbs heat. The refrigerant 26 may absorb heat from relatively warm air 70 passing over the evaporator 42 that transfers heat to the refrigerant 26, such that the air 70 is cooled. In this way, air 70 may be conditioned via cooling before passing into the cabin 20 of the vehicle 10. In some implementations, the refrigerant 26 may evaporate and absorb heat from relatively warmer coolant 30 flowing through a heater core 46 of the coolant loop 28, also positioned within the HVAC case 44, as illustrated in FIG. 2. The heat transfer from the coolant 30 to the refrigerant 26 may cool the coolant 30, so that the coolant 30 is able to receive more heat from the engine 12 and/or other components of the vehicle 10 as the coolant 30 circulates through the coolant loop 28, as described further herein. In the embodiment illustrated in FIG. 2, the refrigerant 26 flows out of the evaporator 42 and back to the compressor 32 through a conduit extending there-between.

As further illustrated in FIG. 2, the refrigerant 26 that flows through the expansion valve 40 coupled to the chiller inlet line 38 flows onward to the chiller 48. As the pressure-reduced refrigerant 26 reaches the chiller 48, heat is transferred from coolant 30 flowing through the chiller 48 to the refrigerant 26, heating the refrigerant 26 and cooling the coolant 30. As described further herein, the chiller 48 may include the vessel 50 having the phase change material 52 disposed therein, such that the coolant 30 transfers heat to the refrigerant 26 and/or the phase change material 52 and the phase change material 52 transfers heat to the refrigerant 26 and solidifies or freezes as refrigerant 26 flows through the chiller 48. As illustrated in FIG. 2, the refrigerant 26 flows out of the chiller 48 and returns to the compressor 32 via a conduit extending there-between. In the illustrated embodiment the conduit extends directly from the chiller 48 to the compressor 32. It is contemplated that the refrigerant 26 flowing out of the chiller 48 may return to compressor 32 indirectly in some embodiments. For example, the conduit may extend out of the chiller 48 and rejoin the conduit extending from the evaporator 42 to the compressor 32. A variety of configurations are contemplated.

In the embodiment illustrated in FIG. 2, the refrigerant loop 24 includes a chiller loop 54 and an evaporator loop 56. Refrigerant 26 flowing through the chiller loop 54 flows out of the compressor 32, through the condenser 34, through the expansion valve 40 coupled to the chiller inlet line 38, through the chiller 48 and back into the compressor 32. Refrigerant 26 flowing through evaporator loop 56 flows out of the compressor 32, through the condenser 34, through the expansion valve 40 coupled to the evaporator inlet line 36, through the evaporator 42 and back into the compressor 32. As such, in the illustrated embodiment, portions of the chiller 48 and evaporator loops 56 are shared. A variety of refrigerant loop 24 designs, having more or fewer components and a variety of configurations, are contemplated.

Referring now to FIGS. 1 and 2, in various embodiments, the compressor 32 of the refrigerant loop 24 may be an engine-driven compressor 32. In other words, the compressor 32 may be powered by the engine 12 of the vehicle 10. For example, the compressor 32 may be driven by a serpentine belt (not shown) that is operably coupled to and spun by the engine 12 in the on condition of the engine 12. As such, the compressor 32 may be operable to propel refrigerant 26 through the refrigerant loop 24 in the on condition of the engine 12. In some embodiments, the compressor 32 may not be configured to propel refrigerant 26 within the refrigerant loop 24 in the off condition of the vehicle 10. It is contemplated that, in some embodiments, the compressor 32 may be powered by additional or alternative power sources (e.g., the battery 14, etc.).

Referring now to FIGS. 1 and 2, the heating and cooling system 22 includes the coolant loop 28. As illustrated in FIG. 2, the coolant loop 28 includes the pump 58. The pump 58 may be configured to propel coolant 30 through the engine 12 of the vehicle 10. Although not illustrated in FIG. 2, in various embodiments, the engine 12 may be positioned downstream of the pump 58 in the coolant loop 28. The coolant 30 flows from the pump 58 into the engine 12. In the on condition of the engine 12, heat from the engine 12 may be transferred to the coolant 30. The coolant 30 exits the engine 12 and flows further within the coolant loop 28. As illustrated in FIG. 2, the coolant loop 28 splits into a heater core inlet line 60 that extends to the heater core 46 and a battery inlet line 62 that extends to the battery 14 of the vehicle 10. A valve system 64 may facilitate the flow of the coolant 30 through the coolant loop 28, generally, and may be particularly configured to regulate the flow of the coolant 30 through the heater core and battery inlet lines 60, 62. For example, in the embodiment illustrated in FIG. 2, the valve system 64 of the coolant loop 28 includes a proportional valve 66 coupled to the heater core inlet line 60 and the battery inlet line 62. The proportional valve 66 controls the flow of the coolant 30 into the heater core and battery inlet lines 60, 62. In various embodiments, the proportional valve 66, the valve system 64, and/or various other components of the heating and cooling system 22 may be coupled to and controlled by a controller 68 configured to receive inputs and control outputs based on a variety of conditions to meet the operational objectives of the heating and cooling system 22 and the vehicle 10 generally. For example, as illustrated in FIG. 2, the controller 68 may be coupled to and configured to control the valve system 64, the proportional valve 66, the pump 58, the expansion valves 40, the compressor 32, and a blower 72.

Coolant 30 that flows through the proportional valve 66 into the heater core inlet line 60 flows onward to the heater core 46. In general operation of the vehicle 10, wherein the engine 12 is in the on condition, the coolant 30 entering the heater core 46 is relatively warm due to heat absorbed from the engine 12. In such embodiments, the coolant 30 within the heater core 46 may be configured to relinquish heat via heat transfer. In some implementations, heat of the coolant 30 within the heater core 46 is transferred to air 70 passing over the heater core 46. For example, the blower 72 may be operable to pass air 70 over the heater core 46, such that the coolant 30, which is warmer than the air 70 due to heat absorbed from the engine 12 in the on condition, transfers heat to the cooler air 70. The air 70 is warmed as a result and, therefore, may provide heat to the cabin 20 of the vehicle 10. In some implementations, heat of the coolant 30 within the heater core 46 is transferred to the refrigerant 26 within the evaporator 42, as described above. As illustrated in FIG. 2, the coolant 30 flows out of the heater core 46 and onward through the coolant loop 28 to the chiller 48. In the on condition of the engine 12, the coolant 30 is configured to transfer heat to the refrigerant 26 flowing through the chiller 48 and/or to the phase change material 52 disposed within the vessel 50 coupled to the chiller 48. The cooled coolant 30 flows out of the chiller 48 and returns to the pump 58.

Coolant 30 that flows through the proportional valve 66 into the battery inlet line 62 flows proximate to the battery 14 of the vehicle 10. For example, the coolant 30 may flow through channels defined by the battery 14 and/or may flow through a conduit coupled to the battery 14. In various embodiments, heat may be exchanged between the battery 14 and the coolant 30 flowing proximate to the battery 14. As described further herein, in some implementations, heat may be transferred from the battery 14 to the coolant 30 to cool the battery 14 in certain circumstances. The coolant 30 flows proximate to the battery 14 and then onward through the coolant loop 28 to the chiller 48. The coolant 30 may be configured to transfer heat to the refrigerant 26 flowing through the chiller 48 and/or to the phase change material 52 disposed within the vessel 50 coupled to the chiller 48. The cooled coolant 30 then flows out of the chiller 48 and returns to the pump 58.

In the embodiment illustrated in FIG. 2, the coolant loop 28 includes a cabin loop 74 and a battery loop 76. Coolant 30 flowing through the cabin loop 74 flows out of the pump 58, through the valve system 64 to the heater core inlet line 60, through the heater core 46, through the chiller 48, and back into the pump 58. Coolant 30 flowing through battery loop 76 flows out of the pump 58, through the valve system 64 to the battery inlet line 62, proximate to the battery 14, through the chiller 48, and back into the pump 58. As such, in the illustrated embodiment, portions of the cabin and battery loops 74, 76 are shared. The valve system 64 may be coupled to the cabin and battery loops 74, 76 and configured to regulate the flow of the coolant 30 within the cabin and battery loops 74, 76. A variety of coolant loop 28 designs, having more or fewer components and a variety of configurations, are contemplated. For example, in various embodiments, the coolant loop 28 may include additional conduit and valves, such that coolant 30 propelled by the pump 58 is optionally able to be rerouted outside of the engine 12 instead of through the engine 12.

In various embodiments, the pump 58 of the coolant loop 28 may be an electrically-driven pump 58. In other words, the pump 58 of the coolant loop 28 may be powered by electricity. For example, in some implementations, the pump 58 may be powered by at least one battery 14 of the vehicle 10. In various embodiments, the pump 58 may be operable to propel coolant 30 within the coolant loop 28 in the on and off conditions of the engine 12. In some examples, the pump 58 may be operable to be powered electrically by the battery 14 irrespective of whether the engine 12 is in the on condition or the off condition. It is contemplated that, in some embodiments, the pump 58 may be driven by the engine 12 in the on condition of the engine 12, and the pump 58 may be electrically driven by the battery 14 in the off condition of the engine 12. A variety of types of pumps 58 configured to propel coolant 30 through the coolant loop 28 are contemplated.

Figure 4:
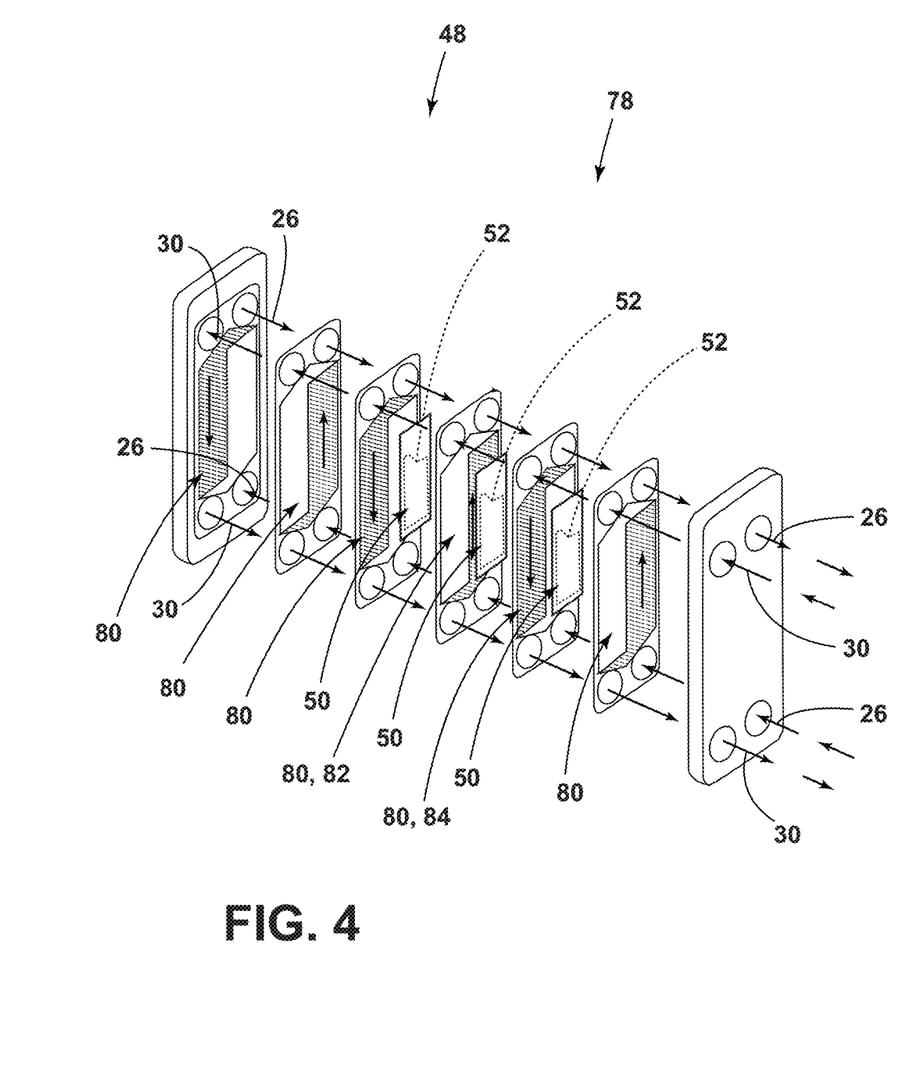
FIG. 4 is an exploded view of a plate chiller of the heating and cooling system of the vehicle, illustrating a plurality of stacked plates and a plurality of vessels containing phase change material positioned between the stacked plates of the plate chiller, according to one embodiment.

Referring now to FIGS. 3 and 4, the heating and cooling system 22 includes the chiller 48. In various implementations, the chiller 48 may be operable to convey coolant 30 and refrigerant 26, such that heat is exchanged between the coolant 30 and the refrigerant 26. For example, in the embodiment illustrated in FIGS. 3 and 4, the chiller 48 is a plate chiller 78 that includes a plurality of stacked plates 80. The plates 80 may be configured to form a plurality of alternating flow channels between the plurality of stacked plates 80, such that the refrigerant 26 and coolant 30 flow through alternating channels and exchange heat through the plurality of stacked plates 80. The size of the chiller 48 (e.g., the number of stacked plates 80 and the surface area of the plates 80) may be varied to achieve a desired amount of heat transfer between the refrigerant 26 and the coolant 30. A variety of types of chillers 48 are contemplated.

Referring still to FIGS. 3 and 4, in various embodiments, the vessel 50 may be coupled to the chiller 48. The vessel 50 may include the phase change material 52. For example, the phase change material 52 may be disposed within the vessel 50. In various embodiments, the vessel 50 may be coupled to the chiller 48, such that the phase change material 52 is in thermal communication with the refrigerant 26 and/or the coolant 30 flowing through the chiller 48. In some embodiments, in which the chiller 48 is the plate chiller 78, the vessel 50 and the phase change material 52 may be positioned between plates 80 of the plate chiller 78. For example, the plate chiller 78 may include a first plate 82 and a second plate 84, and the vessel 50 may be positioned between the first plate 82 and the second plate 84. In various embodiments, a plurality of vessels 50 containing the phase change material 52 may be coupled to the chiller 48. For example, as illustrated in FIG. 4, three vessels 50 that contain the phase change material 52 are configured to be sandwiched between the stacked plates 80 of the plate chiller 78. It is contemplated that the vessel 50 may be coupled to a variety of portions of the chiller 48, such that heat exchange between the phase change material 52 and the refrigerant 26 and/or the coolant 30 is facilitated.

Referring now to FIG. 4, the phase change material 52 may be operable to change phases. In some implementations, the phase change material 52 may be configured to freeze via heat transfer from the phase change material 52 to the refrigerant 26, and the phase change material 52 may be configured to melt via heat transfer from the coolant 30 to the phase change material 52. In some embodiments, the phase change material 52 may be configured to freeze at a temperature in a range of about 10 degrees Celsius to about 30 degrees Celsius. In other words, in some embodiments, the phase change material 52 may freeze and melt at a temperature that is between about 10 degrees Celsius and about 30 degrees Celsius. In some embodiments, the phase change material 52 may be configured to freeze at a temperature in a range of about 15 degrees Celsius to about 25 degrees Celsius. The phase change material 52 may be at least one of a variety of materials configured to change phases from liquid to solid at a temperature of about 15 degrees Celsius to about 25 degrees Celsius, in various embodiments.

Referring now to FIGS. 1-3, in various embodiments, the phase change material 52 disposed within the vessel 50 coupled to the chiller 48 may be configured to serve as a cold storage device that is utilized to cool the coolant 30 in the off condition of the engine 12, wherein the refrigerant 26 is not propelled through the refrigerant loop 24 by the compressor 32. For example, in operation of an exemplary embodiment of the vehicle 10, the engine 12 is initially in the on condition. The electrically-driven pump 58 propels coolant 30 throughout the coolant loop 28, which prevents the engine 12 from over-heating. Meanwhile, the engine-driven compressor 32 propels the refrigerant 26 through the refrigerant loop 24. As a result, cool conditioned air 70 is provided to the cabin 20 of the vehicle 10 via heat transfer to the refrigerant 26 from the air 70 passed over the evaporator 42 by the blower 72, and heated coolant 30 flowing within the chiller 48 is cooled via heat transfer from the coolant 30 to the refrigerant 26 also flowing through the chiller 48. Additionally, the flow of refrigerant 26 through the chiller 48 prompts heat to transfer from the phase change material 52 within the vessel 50 coupled to the chiller 48 to the refrigerant 26. This heat transfer causes the phase change material 52 to freeze within the vessel 50.

Next, the engine 12 is stopped (i.e., the engine 12 goes from the on condition to the off condition). In the off condition of the engine 12, the engine-driven compressor 32 is also stopped, such that the compressor 32 stops propelling refrigerant 26 within refrigerant loop 24. The electrically-driven pump 58 continues to propel coolant 30 through the coolant loop 28 as the pump 58 draws electricity from the battery 14 of the vehicle 10 to operate. As such, in the off condition of the engine 12, the flow of refrigerant 26 within the refrigerant loop 24 stops, and the flow of coolant 30 within the coolant loop 28 continues. In the off condition of the engine 12, the engine 12 produces less heat. As such, less heat is transferred from the engine 12 to the coolant 30. Even so, the coolant 30 may receive some heat transferred from the engine 12 after the engine 12 has stopped, and the coolant 30 also may receive heat from the battery 14 of the vehicle 10, which continues to operate to power the pump 58 and/or various other components of the vehicle 10 in the off condition of the engine 12. Alternatively, the coolant 30 may be routed around the engine 12, such that residual heat exchange from the engine 12 to the coolant 30 is avoided. In such an embodiment, the coolant 30 may still absorb heat from the battery 14, as described above.

In a conventional system, this continued heat transfer to the coolant 30 without the compressor 32 propelling the refrigerant 26 through the chiller 48 to absorb the heat from the coolant 30 may lead to an increase in battery temperature. However, in the exemplary embodiment, heat from the coolant 30 is transferred to the frozen phase change material 52 disposed within the vessel 50 coupled to the chiller 48, which cools the coolant 30, such that the coolant 30 is operable to cool the battery 14 for an extended period after the engine 12 is turned to the off condition (i.e., after the compressor 32 stops propelling refrigerant 26). The phase change material 52 within the vessel 50 may be configured to absorb heat from the coolant 30 at least until the phase change material 52 has changed from the frozen, solid-state, to the melted, liquid-state.

Further, in a conventional system, the engine-driven compressor 32 not propelling refrigerant 26 through the evaporator 42 of the refrigerant loop 24 in the off condition of the engine 12 may inhibit the heating and cooling system 22 from cooling air 70 for the cabin 20 of the vehicle 10. However, in the exemplary embodiment, the coolant 30 may be sufficiently cooled via heat transfer from the coolant 30 to the frozen phase change material 52, such that the coolant 30 propelled within the heater core 46 is cooler than the air 70 passed over the heater core 46 by the blower 72. As such, heat is transferred from the air 70 to the coolant 30, and cooled air 70 is provided to the cabin 20 as a result. Thus, in the off condition of the vehicle 10, air conditioning may be provided to the cabin 20 for an extended period via heat transfer from the air 70 passing over the heater core 46 to the coolant 30 flowing through the heater core 46.

Referring now to FIGS. 2-4, in various embodiments, the blower 72 may be operable to pass air 70 over the heater core 46 in the on and off conditions of the engine 12, wherein in the on condition of the engine 12, heat is transferred from the engine 12 to the coolant 30, such that the coolant 30 is warmer than the air 70 passed over the heater core 46 and the air 70 is heated via heat transfer from the coolant 30 to the air 70, and wherein in the off condition of the engine 12, heat is transferred from the coolant 30 to the phase change material 52, such that the coolant 30 is cooler than the air 70 passed over the heater core 46 and the air 70 is cooled via heat transfer from the air 70 to the coolant 30.

In some embodiments, the vehicle 10 may be a mild hybrid electric vehicle 10. In other words, the vehicle 10 may include the engine 12 and be equipped with the electric motor 18 powered by the traction battery 16 that allows the engine 12 to switch from the on condition to the off condition when the vehicle 10 is coasting, braking, or stopped. In such embodiments, the heating and cooling system 22 may be operable to keep the traction battery 16 from over-heating and/or provide cool air 70 to the cabin 20 of the vehicle 10 via heat transfer from the traction battery 16 and/or air 70 to the coolant 30, and heat transfer from the coolant 30 to the phase change material 52 within the vessel 50 when the engine 12 enters the off condition while the vehicle 10 is temporarily stopped (e.g., traffic jam, etc.). A variety of hybrid and non-hybrid vehicle 10 applications of the heating and cooling system 22 are contemplated.

Figure 5:
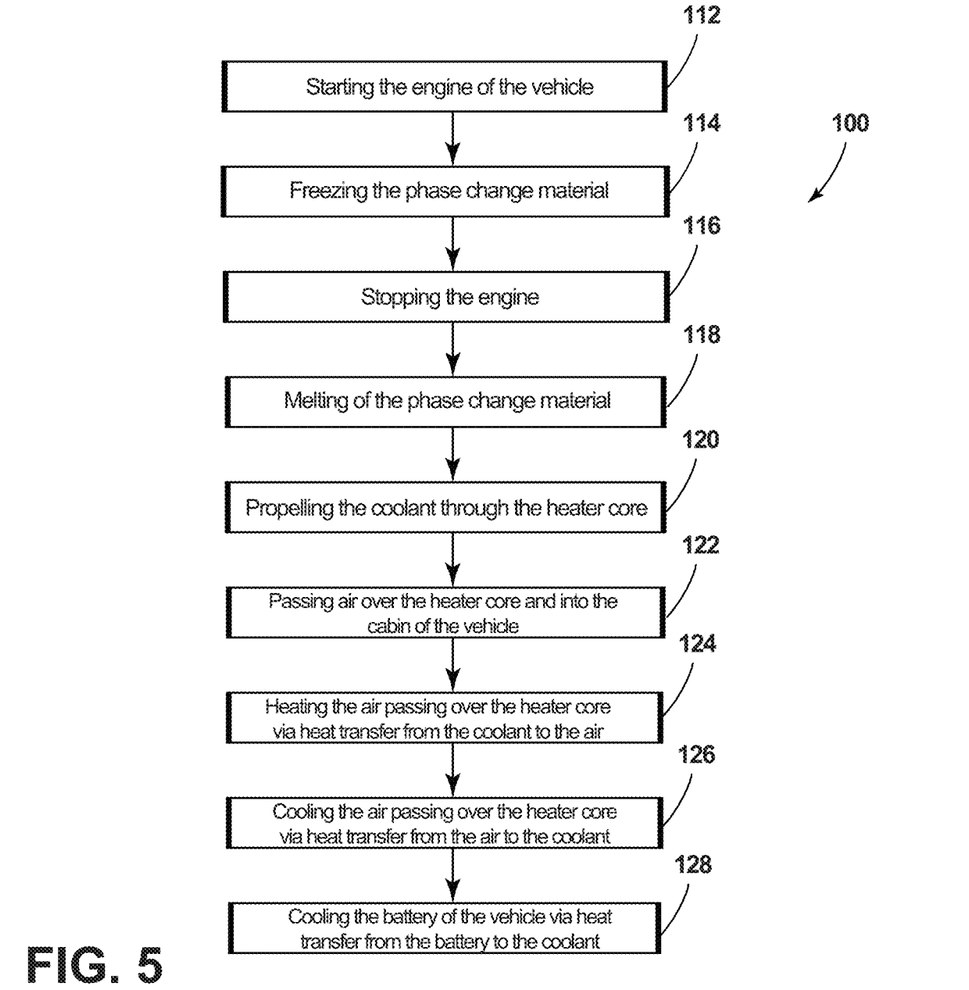
FIG. 5 is a diagram of a method of operating the heating and cooling system, illustrating a plurality of steps of the method, according to one embodiment.

Referring now to FIG. 5, a method 100 of operating the heating and cooling system 22 of the vehicle 10 is shown. The method 100 may include the step 112 of starting the engine 12 of the vehicle 10, such that the engine 12 is in the on condition. As discussed above, in some embodiments, in the on condition of the engine 12, the compressor 32 of the heating and cooling system 22 is operable to propel refrigerant 26 within the refrigerant loop 24.

The method 100 may include the step 114 of freezing the phase change material 52. In some embodiments, the step 114 comprises freezing the phase change material 52 disposed within the vessel 50 coupled to the chiller 48 via heat transfer from the phase change material 52 to the refrigerant 26 conveyed through the chiller 48. The phase change material 52 may freeze in the on condition of the engine 12, as the refrigerant 26 is being propelled through the chiller 48 via the engine-driven compressor 32.

The method 100 may include the step 116 of stopping the engine 12, such that the engine 12 is in the off condition. As discussed above, in some embodiment, in the off condition of the engine 12, the compressor 32 of the heating and cooling system 22 does not propel refrigerant 26 within the refrigerant loop 24. Further, in some embodiments, the pump 58 may be operable to propel the coolant 30 within the coolant loop 28 in the off condition of the engine 12.

The method 100 may include the step 118 of melting the phase change material 52. In some embodiments, the step 118 comprises melting the phase change material 52 via heat transfer from the coolant 30 conveyed through the chiller 48 to the phase change material 52. The phase change material 52 may be configured to melt in the off condition of the engine 12. For example, the phase change material 52 may be configured to melt in the off condition of the vehicle 10 when the refrigerant 26 is not being propelled through the refrigerant loop 24 and the coolant 30 is being propelled through the coolant loop 28 via the electrically-driven pump 58.

The method 100 may include the step 120 of propelling the coolant 30 through the heater core 46. The coolant 30 may be propelled through the heater core 46 of the coolant loop 28 via the pump 58 in the off condition of the engine 12 and the on condition of the engine 12, in some embodiments. The method 100 may further include step 122 of passing air 70 over the heater core 46 and into the cabin 20 of the vehicle 10. In some embodiments, the air 70 may be passed over the heater core 46 by the blower 72. In other words, the blower 72 may be configured to blow or draw air 70 over the heater core 46 and into the cabin 20. In some embodiments, the air 70 may be passed over the heater core 46 via movement of the vehicle 10. For example, forward movement of the vehicle 10 may cause air 70 to pass through a grill of the vehicle 10 (not shown), over the heater core 46, and into the cabin 20 of the vehicle 10.

The method 100 may include the step 124 of heating the air 70 passing over the heater core 46 via heat transfer from the coolant 30 to the air 70. In the step 124, the coolant 30 flowing within the heater core 46 may be warmer than the air 70 passing over the heater core 46, such that the air 70 absorbs heat from the coolant 30, cooling the coolant 30, and warming the air 70. The step 124 of heating the air 70 passing over the heater core 46 may occur in the on condition of the engine 12, as the coolant 30 may be relatively warm due to heat absorption from the engine 12.

The method 100 may include the step 126 of cooling the air 70 passing over the heater core 46 via heat transfer from the air 70 to the coolant 30. In the step 126, the coolant 30 flowing within the heater core 46 may be cooler than the air 70 passing over the heater core 46, such that the coolant 30 absorbs heat from the air 70, cooling air 70, and warming the coolant 30. The step 126 of cooling the air 70 passing over the heater core 46 via heat transfer from the air 70 to the coolant 30 may occur in the off condition of the engine 12, as the coolant 30 may be relatively cool due to heat transfer from the coolant 30 to the phase change material 52 and less heat transfer from the engine 12 to the coolant 30.

The method 100 may include the step 128 of cooling the battery 14 of the vehicle 10 via heat transfer from the battery 14 to the coolant 30. In various embodiments, the step 128 may occur in the off condition of the engine 12. In the off condition of the vehicle 10, the battery 14 of the vehicle 10 may be cooled via heat transfer from the battery 14 to the coolant 30, as the coolant 30 may be cooled due to heat transfer from the coolant 30 to the phase change material 52, and as less heat may be transferred from the stopped engine 12 to the coolant 30 relative to the amount of heat transferred to the coolant 30 from the engine 12 in the on condition.

It is to be understood that, unless specifically stated otherwise in the claims, the steps of the method 100 of operating the heating and cooling system 22 of the vehicle 10 need not be performed in the order that each step is listed above. Additionally, it is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle having a heating and cooling system, comprising:
   a refrigerant loop for conveying refrigerant;
   a coolant loop for conveying coolant;
   a chiller configured to convey the refrigerant and the coolant;
   a vessel coupled to the chiller and having a phase change material disposed within the vessel, wherein the phase change material is configured to freeze via heat transfer from the phase change material to the refrigerant and melt via heat transfer from the coolant to the phase change material; and
   an engine operable between ON and OFF conditions, wherein the phase change material is configured to freeze via heat transfer from the phase change material to the refrigerant in the ON condition of the engine and to melt via heat transfer from the coolant to the phase change material in the OFF condition of the engine.

2. The vehicle of claim 1, wherein the chiller is a plate chiller, comprising:
   a first plate; and
   a second plate, wherein the vessel is positioned between the first plate and the second plate.

3. The vehicle of claim 1, further comprising:
   a blower operable to pass air over a heater core of the coolant loop in the ON and OFF conditions of the engine, wherein in the ON condition of the engine, heat is transferred from the engine to the coolant, such that the coolant is warmer than the air passed over the heater core and the air is heated via heat transfer from the coolant to the air, and wherein in the OFF condition of the engine, heat is transferred from the coolant to the phase change material, such that the coolant is cooler than the air passed over the heater core and the air is cooled via heat transfer from the air to the coolant.

4. The vehicle of claim 1, wherein the coolant loop comprises:
   a battery loop configured to convey coolant to cool the battery via heat transfer from the battery to the coolant.

5. The vehicle of claim 4, wherein in the OFF condition of the engine, a pump is operable to propel coolant through the battery loop, such that heat is transferred from the battery to the coolant, and through the chiller, such that heat is transferred from the coolant to the phase change material.

6. A vehicle having a heating and cooling system, comprising:
   a refrigerant loop for conveying refrigerant;
   a coolant loop for conveying coolant;
   a plate chiller configured to convey the refrigerant and the coolant, the plate chiller comprising a first plate and a second plate; and
   a vessel positioned between the first plate and the second plate, wherein a phase change material is disposed within the vessel, and the phase change material is configured to freeze via heat transfer from the phase change material to the refrigerant and to melt via heat transfer from the coolant to the phase change material.

7. The vehicle of claim 6, further comprising:
   an engine operable between ON and OFF conditions, wherein the phase change material is configured to freeze via heat transfer from the phase change material to the refrigerant in the ON condition of the engine and melt via heat transfer from the coolant to the phase change material in the OFF condition of the engine.

8. The vehicle of claim 7, further comprising:
   a blower operable to pass air over a heater core of the coolant loop in the ON and OFF conditions of the engine, wherein in the ON condition of the engine, heat is transferred from the engine to the coolant, such that the coolant is warmer than the air passed over the heater core and the air is heated via heat transfer from the coolant to the air, and wherein in the OFF condition of the engine, heat is transferred from the coolant to the phase change material, such that the coolant is cooler than the air passed over the heater core and the air is cooled via heat transfer from the air to the coolant.

9. The vehicle of claim 7, wherein the coolant loop comprises:

a battery loop configured to convey coolant to cool a battery of the vehicle via heat transfer from the battery to the coolant.

10. The vehicle of claim 9, wherein in the off condition of the engine, a pump is operable to propel coolant through the battery loop, such that heat is transferred from the battery to the coolant, and through the plate chiller, such that heat is transferred from the coolant to the phase change material.

\* \* \* \* \*